United States Patent
Croxford et al.

(10) Patent No.: US 8,122,232 B2
(45) Date of Patent: Feb. 21, 2012

(54) SELF PROGRAMMING SLAVE DEVICE CONTROLLER

(75) Inventors: Daren Croxford, Cambridgeshire (GB); Graeme Leslie Ingram, Royston (GB)

(73) Assignee: ARM Limited, Cambridge (GB)

( * ) Notice: Subject to any disclaimer, the term of this patent is extended or adjusted under 35 U.S.C. 154(b) by 1017 days.

(21) Appl. No.: 11/812,808

(22) Filed: Jun. 21, 2007

(65) Prior Publication Data
US 2008/0320292 A1 Dec. 25, 2008

(51) Int. Cl.
*G06F 9/24* (2006.01)
*G06F 15/177* (2006.01)

(52) U.S. Cl. .................. 713/1; 713/2; 713/100; 710/40; 710/41

(58) Field of Classification Search .................. 713/1, 2, 713/100; 710/40, 41
See application file for complete search history.

(56) References Cited

U.S. PATENT DOCUMENTS

| | | | | |
|---|---|---|---|---|
| 5,418,924 A | * | 5/1995 | Dresser | 713/600 |
| 5,522,064 A | * | 5/1996 | Aldereguia et al. | 713/501 |
| 5,613,162 A | * | 3/1997 | Kabenjian | 710/22 |
| 6,694,492 B1 | * | 2/2004 | Shakkarwar | 716/2 |
| 6,748,464 B2 | * | 6/2004 | Mori et al. | 710/36 |
| 6,851,069 B1 | * | 2/2005 | Ahmad et al. | 713/503 |
| 7,382,655 B2 | * | 6/2008 | Lin | 365/185.22 |
| 7,506,110 B2 | * | 3/2009 | Neils et al. | 711/154 |
| 2006/0248388 A1 | * | 11/2006 | Kanamori et al. | 714/25 |
| 2007/0079080 A1 | * | 4/2007 | Sanders et al. | 711/154 |

* cited by examiner

*Primary Examiner* — Thuan Du
*Assistant Examiner* — Michael J Brown
(74) *Attorney, Agent, or Firm* — Nixon & Vanderhye P.C.

(57) ABSTRACT

A self programming slave device controller is described which comprises interface circuitry and control circuitry. The interface circuitry is responsive to one or more configuration parameters to communicate data between the slave device controller and a slave device in accordance with the one or more configuration parameters. The control circuitry is responsive to one or more operating parameter signals indicative of one or more operating parameters influencing current performance characteristics of the slave device to set the one or more configuration parameters so as to control an access operation for accessing the slave device to accommodate the current performance characteristics of the slave device. In this way, an access operation can be conducted efficiently and reliably having regard to the current performance characteristics of the slave device. This makes it possible to automatically adjust configuration parameters used to control an access operation in dependence on changes to operating parameters of the slave device which may influence the performance characteristics.

33 Claims, 8 Drawing Sheets

| Clock Frequency | | | | | |
|---|---|---|---|---|---|
| $f_3$ | 2 | 2 | 2 | 1 | |
| $f_2$ | 3 | 2 | 2 | 1 | |
| $f_1$ | 4 | 3 | 2 | 2 | |
| | $V_1$ | $V_2$ | $V_3$ | $V_4$ | Voltage |

SELF PROGRAMMING SLAVE DEVICE CONTROLLER

BACKGROUND OF THE INVENTION

1. Field of the Invention

This invention relates to self programming slave device controllers.

2. Description of the Prior Art

In a data processing apparatus, devices may be coupled together by a bus infrastructure to enable communication of data signals, address signals and control signals between the devices. The devices may include bus master devices, such as a core processor or a DMA (Direct Memory Access) controller, which can submit transactions to the bus, and bus slave devices, such as memory devices or an I/O (Input/Output) interface which can be accessed over the bus by the bus master devices.

The bus slave devices will typically be provided with a slave device controller which controls access to the slave device when access requests are received over the bus. A slave device controller may either form part of the slave device itself or may be provided as a discrete component. A slave device controller may control access to a slave device in accordance with one or more parameters, such as the number of clock cycles to be allocated to the access operation. These parameters may be configured at compile time, they may be programmable via a programming interface, or they may be selectable via an input. If performance characteristics, such as an access latency, of the slave device should change, the control of an access operation by the slave device controller may result in an inefficient use of system resources thereby wasting power, or alternatively may result in a failed access.

SUMMARY OF THE INVENTION

Viewed from one aspect, the present invention provides a self programming slave device controller, comprising:

interface circuitry responsive to one or more configuration parameters to communicate data between said slave device controller and a slave device in accordance with said one or more configuration parameters; and control circuitry responsive to one or more operating parameter signals indicative of one or more operating parameters influencing current performance characteristics of accesses to said slave device to set said one or more configuration parameters so as to control an access operation for accessing said slave device to accommodate said current performance characteristics.

In this way, an access operation can be conducted efficiently and reliably having regard to the current performance characteristics of accesses to the slave device. This makes it possible to automatically adjust the configuration parameters used to control an access operation in dependence on changes in operating parameters which may influence the performance characteristics. Reprogramming the configuration parameters under software control would consume processing cycles (and thus degrade power efficiency and performance), be relatively slow and ill suited to tracking what can be rapidly and frequently changing operating parameters.

The present technique recognises that the performance characteristics of a slave device can vary according to current operating parameters of the slave device. For instance, the operating parameters may include one or both of a supply voltage applied to the slave device, and a frequency of a clock signal applied to the slave device controller and relative to which timing parameters of the slave device are measured. In particular, an increase in supply voltage may have an effect of reducing the access latency of the slave device in absolute terms, whereas an increase in the frequency of the clock signal may not actually directly effect the access latency of the slave device in absolute terms, but may have an effect of the number of clock cycles required to accommodate the access latency of the slave device. The voltage and clock frequency can be directly provided to the controller as operating parameter signals and used to set the configuration parameters for controlling slave (memory) access. In this way, the access operation can be conducted to accommodate an access latency of the slave device without wasting clock cycles, by continuously or periodically updating the configuration parameters automatically in dependence on changes in the supply voltage and clock frequency.

Operating parameters such as voltage and clock frequency may change dynamically for a number of reasons. For example, systems commonly have a number of power modes to enable a reduction in power consumption by selecting an appropriate power mode for a given scenario. For instance, if the system is currently experiencing a relatively low processing demand, a low-power mode may be entered, for instance by reducing one or both of the supply voltage and clock frequency to all or part of the system. Alternatively, a clock could be disabled entirely.

A system power management unit (PMU), Intelligent Energy Management (IEM) hardware and software or an advanced interconnect may frequently change system clock frequency and/or voltage to reduce power consumption depending on workload. With the present technique it is possible for a slave device controller to adapt its configuration parameters in response to such voltage and clock frequency modifications to improve performance of access operations to the slave device, and to further reduce power consumption.

The voltage and clock frequency indicating signals may be provided by the slave device itself, by the master device which requested access to the slave device, or in a case where the memory controller forms part of an on-chip interconnect, by the interconnect itself.

The operating parameter signals may include an output signal from a delay line associated with said slave device, the output signal being indicative of a speed of operation of said slave device. In this way, the performance characteristics of the slave device can be inferred from the performance characteristics of the delay line, which can be formed with the slave device in the same region of an integrated circuit, and will thus respond to changes in operating parameters in a similar manner to the slave device. As well as providing a more direct measurement of the current performance of the slave device, this can enable the specific physical characteristics of the slave device resulting from the manufacturing process to be taken into account.

It is also possible in accordance with some embodiments of the present technique for the configuration parameters to be set to control access operations by issuing wait states, modifying clock enables or removing clock signals depending on the operating parameters to ensure that asynchronous domain requirements are met.

The self programming slave device controller may be a self programming memory controller, and said slave device a memory. Memory accesses occur frequently and often form bottlenecks in system performance. Accordingly, it is important that the performance of the memory should be fast and reliable, but also that memory accesses should be power efficient to reduce overall system power consumption. In the case of a memory controller, the performance characteristics may include one or more timing dependent parameters of said memory.

Where the performance characteristics include a memory access latency of the memory, the configuration parameters may include memory access parameters which are set so as to control an access time for accessing the memory to accommodate the current access latency of the memory. The memory access latency may be a read access latency, in which case the memory access parameters will include a read access parameter for controlling a read access to the memory to accommodate a current read access latency of the memory. The memory access latency may also be a write access latency in which case the memory access parameters will include a write access parameter for controlling a write access to the memory to accommodate a current write access latency of the memory.

The configuration parameters may be set using a look up table which provides a correspondence between the configuration parameters and one or more of the operating parameters. Alternatively, the configuration parameters may be set in accordance with a calculation function which defines a relationship between the configuration parameters and one or more of the operating parameters.

The configuration parameters may be stored in a plurality of banks of configuration parameters. In this case, the control circuitry may be response to said operating parameter signals to select one of said banks of configuration parameters for controlling said access operation.

Viewed from another aspect, the present invention provides a self programming memory controller responsive to one or more operating parameters influencing current performance characteristics of an associated memory to set one or more configuration parameters for controlling the communication of data between said memory controller and said memory.

Viewed from another aspect, the present invention provides a self programming slave device controller, comprising:
 interface means for communicating data between said slave device controller and a slave device in accordance with one or more configuration parameters; and
 control means for setting said one or more configuration parameters in response to one or more operating parameter signals indicative of one or more operating parameters influencing current performance characteristics of accesses to said slave device, said configuration parameters being set to control an access operation for accessing said slave device to accommodate said current performance characteristics.

Viewed from yet another aspect, the present invention provides a method of self programming a slave device controller, comprising the steps of:
 communicating, responsive to one or more configuration parameters, data between a slave device controller and an associated slave device in accordance with said one or more configuration parameters; and
 setting, responsive to one or more operating parameter signals indicative of one or more operating parameters influencing current performance characteristics of accesses to said slave device, said one or more configuration parameters being set so as to control an access operation for accessing said slave device to accommodate said current performance characteristics.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
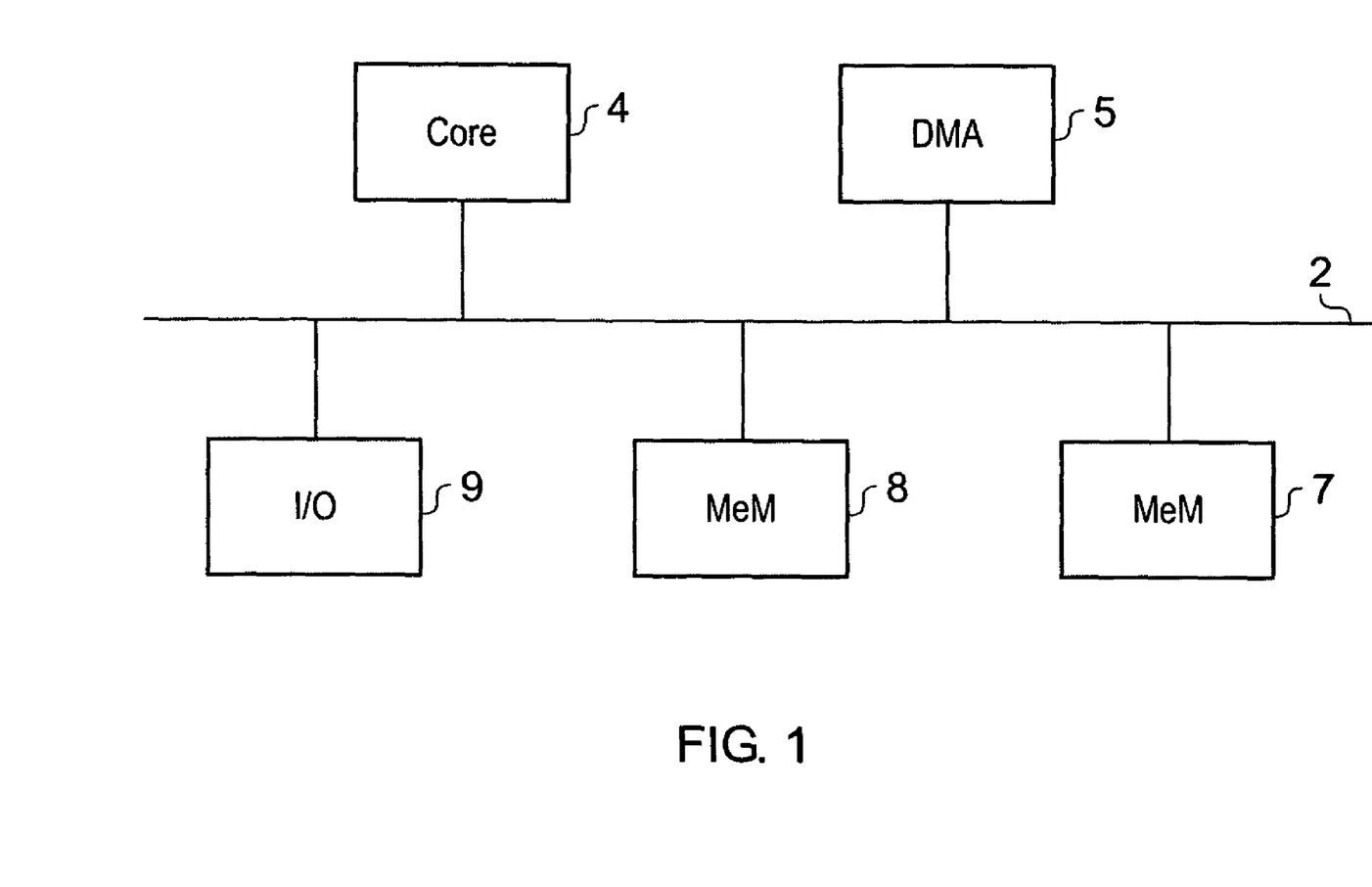
FIG. 1 schematically illustrates several data processing devices connected together via a bus.

FIG. 1 schematically illustrates a data processing apparatus in which a plurality of devices are coupled together by a bus 2 to enable communication of data signals, address signals and control signals between the devices. In particular, a processor core 4 and a DMA (Direct Memory Access) controller 5 are provided as bus master devices which can access the bus 2, and a first memory device 7, a second memory device 8 and an I/O (Input/Output) interface 9 are provided as bus slave devices which can be accessed over the bus 2 by the bus master devices. Each of the first memory device 7 and the second memory device 8 are accessible over the bus 2 using an associated memory controller (not shown). A separate memory controller could be provided for each of the memory devices, or a single memory controller could be provided to control both of the memory devices. The I/O interface 9 is accessible using an I/O controller (not shown). The memory controller and I/O controller could either be provided integrally with the associated slave device, or could be separate from the associated slave device. While the following description of an example embodiment is directed to a memory device and memory controller arrangement, the same principles can be applied to an I/O interface and an I/O controller, or to any suitable slave device and slave device controller.

Figure 2:
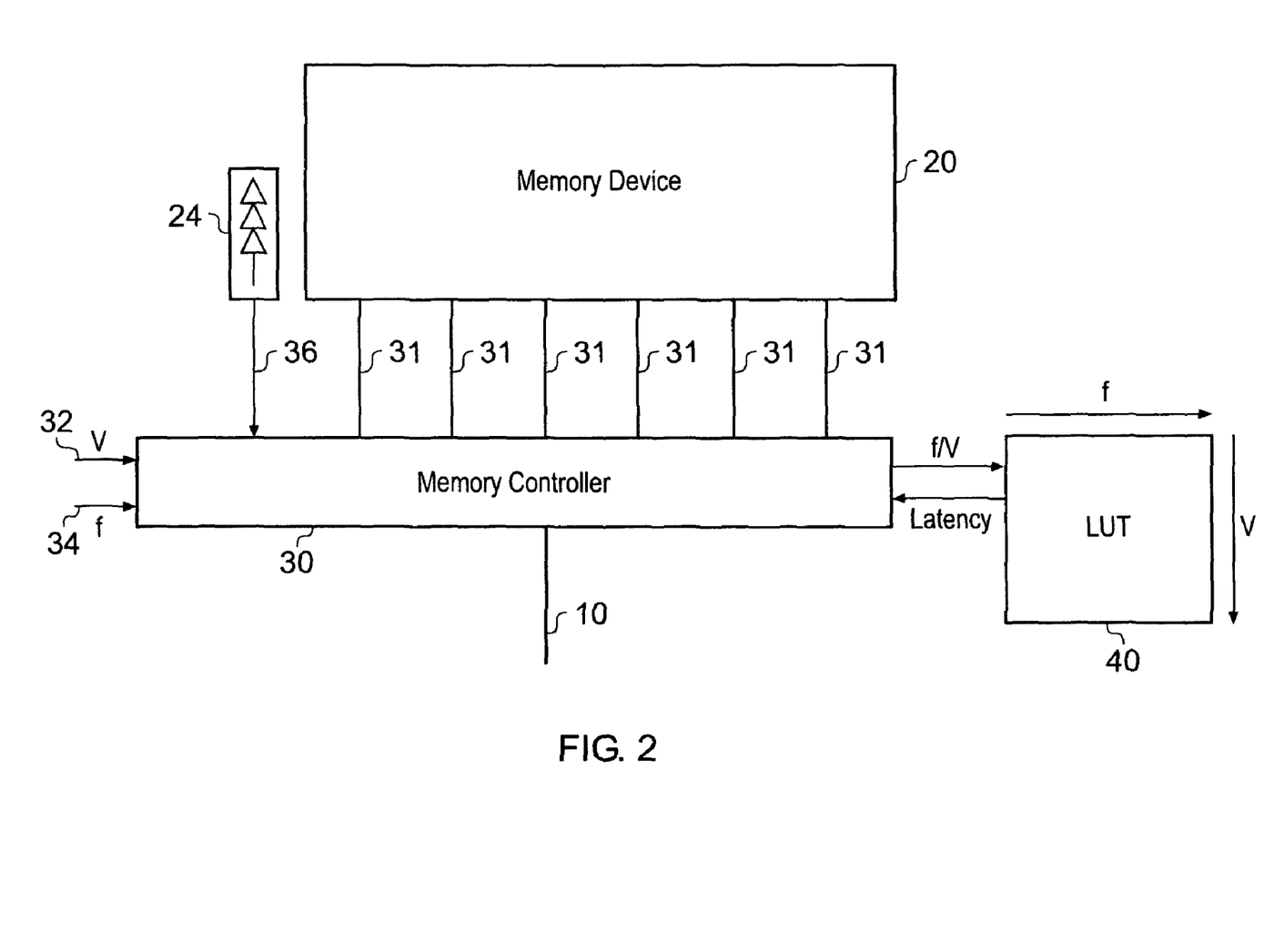
FIG. 2 schematically illustrates a memory controller and memory device.

Referring to FIG. 2, a memory device 20 and a memory controller 30 are coupled together via a plurality of signal lines 31 which carry address, control and data signals between the memory device 20 and the memory controller 30. The memory device 20 may be any type of memory device, such as a ROM (Read Only Memory) device, Flash memory, a SRAM (Static Random Access Memory) device, or an embedded DRAM (Dynamic Random Access Memory) device. The memory device 20 serves to store data in an array of memory cells which are addressable by the memory controller using address signals. A delay line 24 is associated with the memory device 20 and comprises a series of invertors which each exhibit a delay when switching an output state in response to a change in input state. In this way, by changing the state of the input to the first inverter in the series at a time $t_0$ and measuring a time delay between the time $t_0$ and a later time $t_1$ at which the output of the last inverter in the series switches state, it is possible to measure the response time of the delay line. The response time of the delay line is a function of the physical characteristics of the material from which the invertors are formed and also other parameters such as supply voltage and temperature. Due to the fact that the delay line and the memory device are formed close together from the same material and likely subject to the same manufacturing process variations, the response time of the delay line provides a dynamic indication of the performance characteristics of the memory device.

The memory controller 30 may be either an on-chip or off-chip memory controller and is responsive to memory access requests received over a bus 10 to control access to the memory device 20 to meet the memory access requests. In the case of a read access request, the memory controller 30 will apply on the signal lines 31 address signals which specify the location of data to be read from the memory device 20 and control signals which control the read operation. The memory device 20 will operate in response to the address and control signals to retrieve the requested data and apply it onto the signal lines 31. In the case of a write access request, the memory controller 30 will apply on the signal lines 31 address signals which specify the location where data is to be written to the memory device 20, control signals which control the write operation, and data signals of the data to be written. The memory device 20 will operate in response to the address, control and data signals provided by the memory controller 30 to store the provided data into memory cells of the memory device 20.

Taking SDRAM (Synchronous Dynamic Random Access Memory) as an example, the memory is formed in a grid arrangement with a plurality of rows and columns, and data is stored in the memory at row/column intersections. When data is accessed from the memory, the following steps need to be executed:

(1) a row of the memory is activated in dependence on a memory address;
(2) a read or write command is issued, along with a column address;
(3) when access to another row is required, the current row is deactivated, and then a new row is activated.

It will therefore be appreciated that reading data from or writing data into a memory device takes a predetermined amount of time, and may be different in the case of reading and writing of data. This predetermined amount of time is referred to as the access latency of the memory, and can include several components. For instance, in the case of SDRAM, the several different types of access latency are defined, including tRAS, tRP, tRCD and tCAS. In particular, tRAS is the minimum allowable time for a row to be opened (time required for step (1) above), tRP is the time required to terminate access to an open row of memory, and to open the next row (time required for step (3) above), tRCD is the time required between a row address strobe and a column address strobe (time required between step (1) and step (2) above), and tCAS, normally called the CAS latency, is the time required to access a certain column of data (once the read or write command of step (2) has been issued).

It will further be appreciated that if the memory controller fails to wait an appropriate amount of time at each stage of an access operation according to steps (1) to (3) above, the memory may not have time to fully respond and the access operation may therefore fail. As such, a memory controller would traditionally be configured to ensure that the amount of time allocated by the memory controller to a read or write operation would be sufficient to allow the memory to respond fully to permit reliable access to the memory. However, access latency is not fixed for all conditions. For instance, a variation in supply voltage may affect access latency, and in particular an increase in supply voltage is likely to result in a reduction in access latency. Additionally, a variation in clock frequency, while not affecting the access latency of the memory in terms of time, may alter the number of clock cycles required to accommodate that access latency. Other factors which may influence access latency include temperature and process (whether the silicon material from which the memory has been formed is "fast" or "slow"). Accordingly, a traditional memory controller would allocate a number of clock cycles to an access operation assuming a notional worst case scenario for access latency.

The present technique seeks to reduce power consumption by providing a memory controller 30 which is able to dynamically program itself to efficiently access an associated memory device by setting configuration parameters used to control access operations in dependence on one or more of a supply voltage, clock frequency or the physical state of the memory.

It will however be appreciated that not all changes in access latency need result in a change to the configuration parameters. For example, SDRAM has many timing parameters, but only a small number of these have a significant impact on performance.

The memory controller 30 automatically determines the access latency of the memory in dependence on a supply voltage indicating signal received at a first input 32 and clock frequency information received at a second input 34. In particular, the memory controller 30 provides the received supply voltage V and clock frequency f to a look-up table (LUT) 40, which stores a correspondence between memory access latency and a plurality of combinations of supply voltage V and clock frequency f. The memory controller then uses the determined access latency to set the configuration parameters, either by de-rating previously programmed configuration parameters, by selecting a different bank of configuration parameters, or by setting the configuration parameters directly.

Either in addition to or instead of the supply voltage V and clock frequency f, the memory controller 30 may take into account a delay value provided at a third input 36 from the delay line 24. The delay value provides an indirect measure of the current performance characteristics of the memory, and can thus also be used to set the configuration parameters. For instance, the output of the look-up table could be modified in dependence on the delay value to take into account the specific physical characteristics of the individual memory resulting from the manufacturing process.

Figure 3:
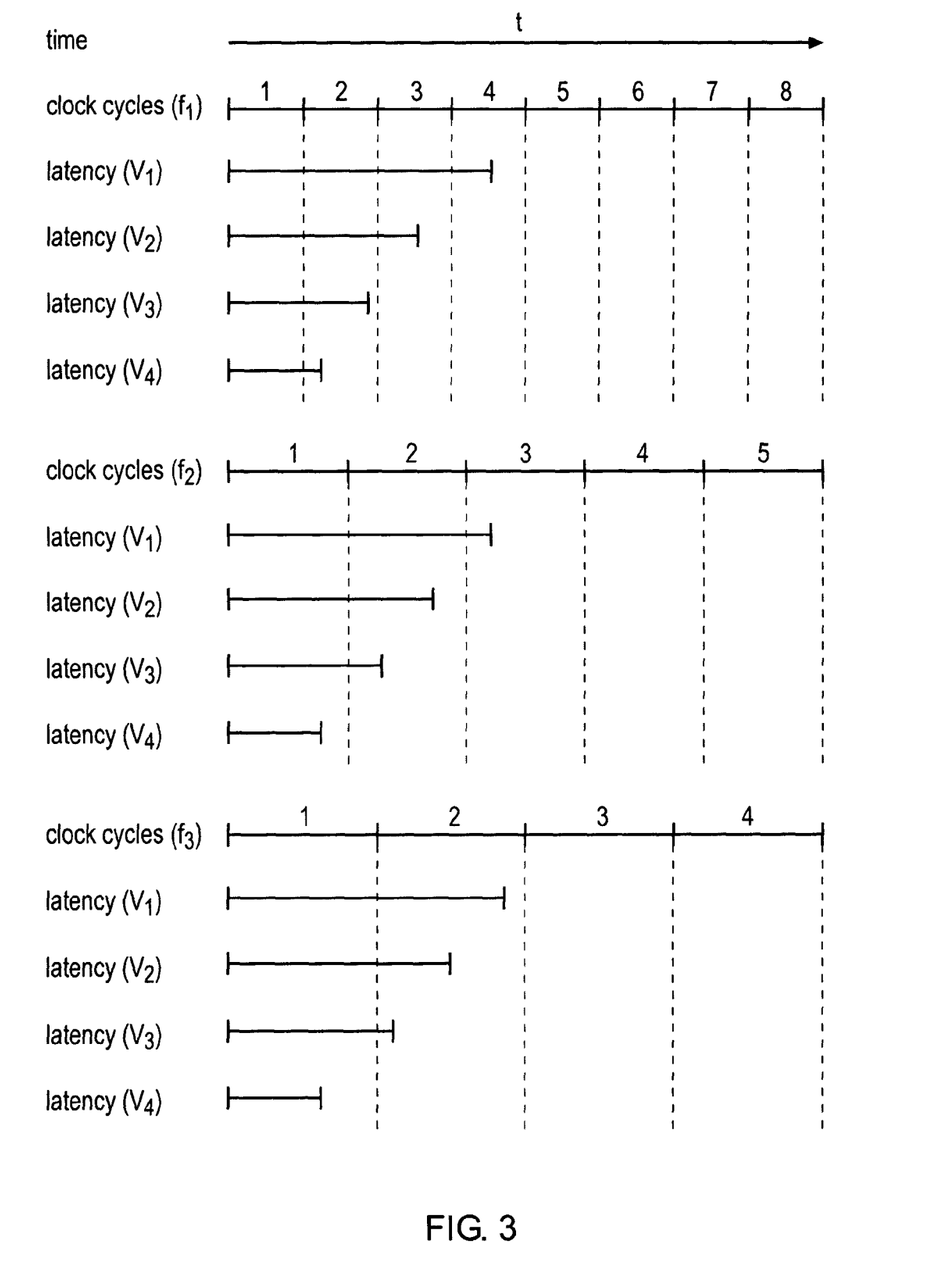
FIG. 3 is a schematic timing diagram illustrating a relationship between memory latency, clock frequency and supply voltage in a memory device.

Referring to FIG. 3, a relationship between access latency of a memory and the supply voltage and clock frequency is schematically illustrated. FIG. 3 is divided vertically into 3 portions, each corresponding to a different clock frequency. In particular, the top portion corresponds to a first clock frequency $f_1$, the middle portion corresponds to a second clock frequency $f_2$, and the bottom portion corresponds to a third clock frequency $f_3$, where $f_1 > f_2 > f_3$. Within each portion, the access latency for a memory is illustrated as a horizontal line for each of four different supply voltages. In particular, the top line in each portion corresponds to a first supply voltage $V_1$, the second line in each portion corresponds to a second supply voltage $V_2$, the third line in each portion corresponds to a third supply voltage $V_3$, and the bottom line in each portion corresponds to a fourth supply voltage $V_4$, where $V_1 < V_2 < V_3 < V_4$. All three portions of FIG. 3 share a common horizontal axis representing time, t which is shown once at the top of FIG. 3. Each portion of FIG. 3 is divided horizontally along the time axis into clock cycles. The number of clock cycles into which each portion is divided is dependent on the clock frequency to which that portion corresponds. In the present case, this means that the top portion, corresponding to the frequency $f_1$ is divided into 8 clock cycles, the middle portion, corresponding to the frequency $f_2$ is divided into 5 clock cycles, and the bottom portion, corresponding to the frequency $f_3$ is divided into 4 clock cycles.

It can be seen from FIG. 3 that the access latency of the memory in units of time is influenced by the supply voltage, such that the access latency corresponding to supply voltage $V_1$ is greater than the access latency corresponding to supply voltage $V_2$, which in turn is greater than the access latency corresponding to supply voltage $V_3$, which again in turn is greater than the access latency corresponding to supply voltage $V_4$. This is likely to be the case where $V_1 < V_2 < V_3 < V_4$ because an increase in supply voltage tends to result in a decrease in access latency.

It can also be seen from FIG. 3 that the access latency of the memory in units of time is not influenced by clock frequency. However, the number of cycles required to accommodate the access latency of the memory does change as a result of the change in clock frequency. For instance, it can be seen that at a clock frequency $f_1$ (top portion of FIG. 3), 4 clock cycles are required to accommodate the access latency corresponding to the supply voltage $V_1$, whereas at a clock frequency $f_2$ (middle portion of FIG. 3), 3 clock cycles are required to accommodate the access latency corresponding to the supply voltage $V_1$, and at a clock frequency $f_3$ (bottom portion of FIG. 3), only 2 clock cycles are required to accommodate the access latency corresponding to the supply voltage $V_1$.

Figure 4:
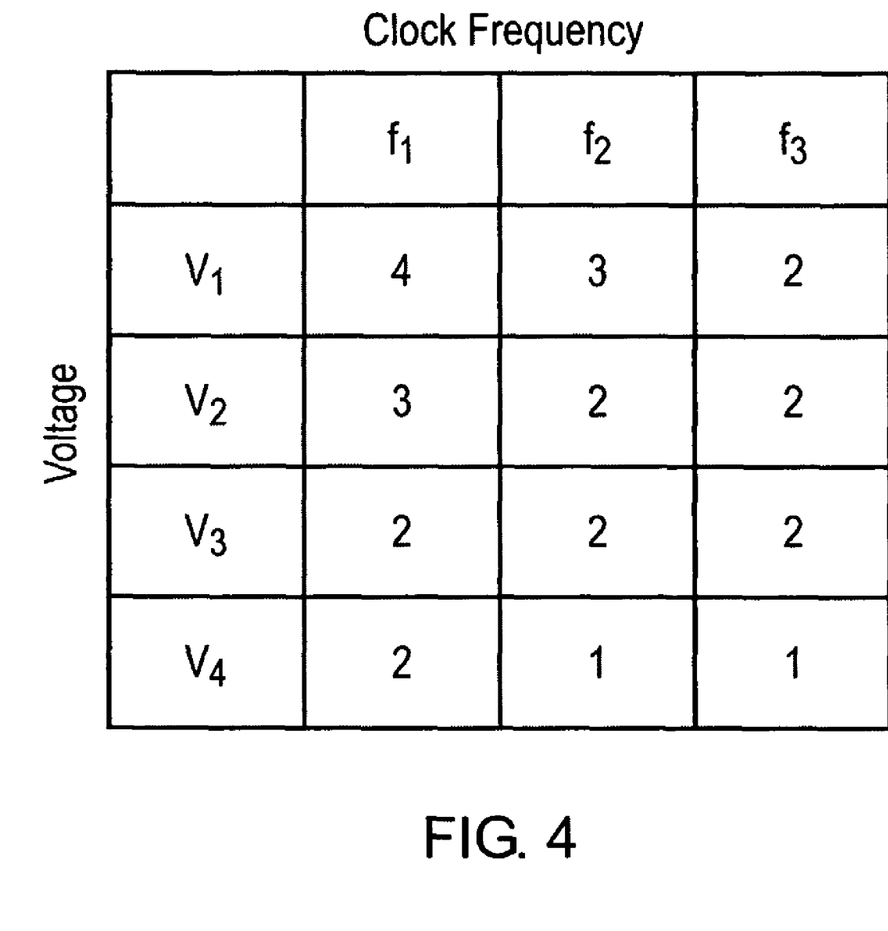
FIG. 4 schematically illustrates a look-up table specifying a number of clock cycles required to accommodate an access latency of a memory device as a function of clock frequency and supply voltage.

Referring to FIG. 4, an example look-up table is schematically illustrated which specifies, in respect of each combination of supply voltage and clock frequency of FIG. 3, the number of clock cycles required to accommodate the access latency of the memory. In particular, each column of the look-up table corresponds to a particular one of the frequencies $f_1$, $f_2$ or $f_3$ of FIG. 3, and each row of the look-up table corresponds to a particular one of the supply voltages $V_1$, $V_2$, $V_3$ or $V_4$ of FIG. 3. It can be seen that at the first frequency $f_1$, the number of clock cycles required to accommodate the access latency of the memory varies from 4 clock cycles (at the supply voltage $V_1$) down to 2 clock cycles (at the supply voltage $V_4$). It can also be seen that at the second frequency $f_2$, the number of clock cycles required to accommodate the access latency of the memory varies from 3 clock cycles (at the supply voltage $V_1$) down to 1 clock cycle (at the supply voltage $V_4$). Finally, it can be seen that at the third frequency $f_3$, the number of clock cycles required to accommodate the access latency of the memory varies from 2 clock cycles (at the supply voltage $V_1$) down to 1 clock cycle (at the supply voltage $V_4$).

By selecting the number of clock cycles for conducting an access operation in this way, it is possible to ensure that the access operation will be reliable, because the access latency of the memory will always be accommodated, without wasting clock cycles (and thus reducing performance) by selecting a fixed number of clock cycles which will accommodate all eventualities.

Figure 5A:
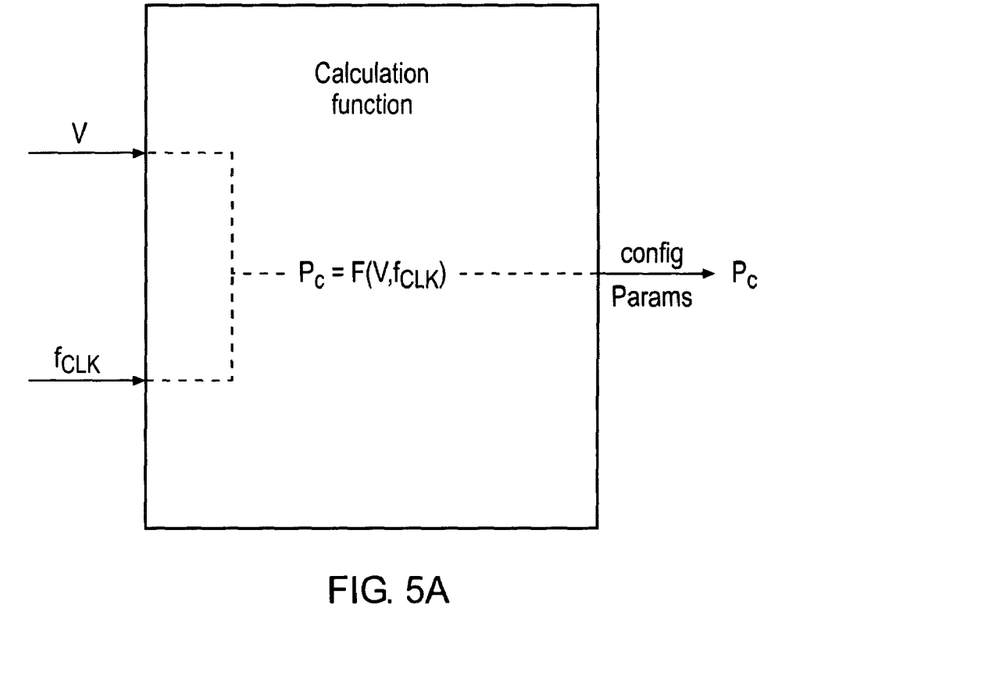
FIGS. 5A and 5B respectively schematically illustrate the application of a calculation function to inputted voltage and clock frequency signals to generate configuration parameters for controlling an access operation to a memory device; and the application of a calculation function to an inputted delay signal to generate configuration parameters for controlling an access operation to a memory device.
Figure 5B:
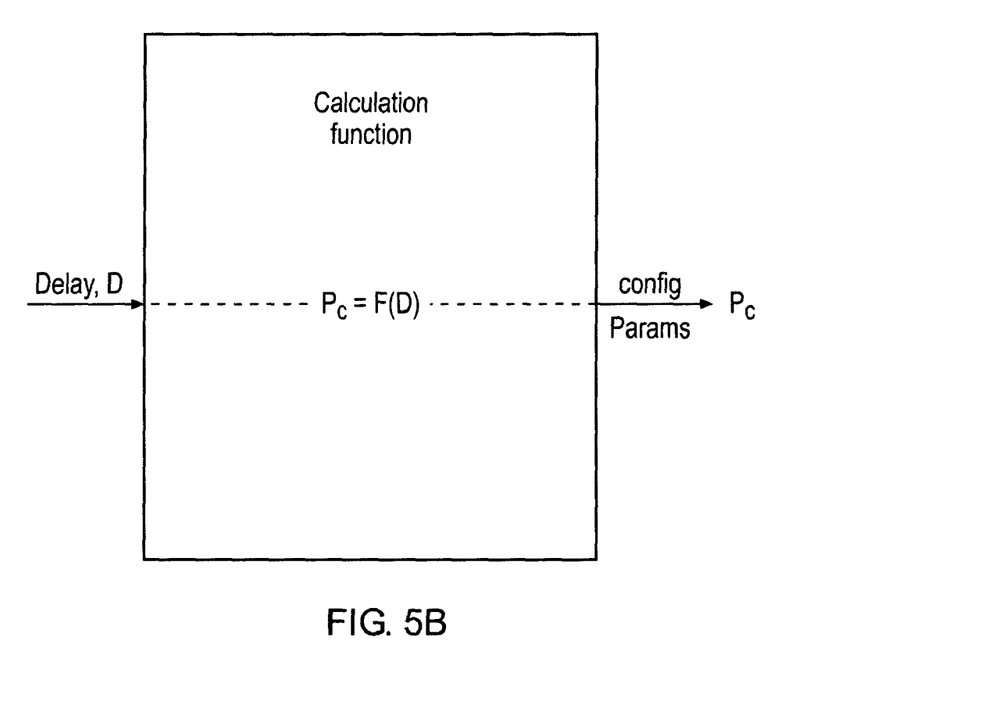

Referring to FIGS. 5A and 5B, as an alternative to using look up tables to determine configuration parameters, a calculation function can be provided in the memory controller for determining configuration parameters in dependence on input signals received by the memory controller. In FIG. 5A, a calculation function is shown which receives a signal corresponding to the supply voltage V and a signal corresponding to the clock frequency $f_{clk}$ as inputs, and calculates configuration parameters $P_c$ as a function of the supply voltage V and the clock frequency $f_{clk}$ in accordance with a general relationship:

$$P_c = F(V, f_{clk}) \quad \text{(equation 1)}$$

The function F( ) may be one of many possible functions which provide a mapping from the supply voltage V and the clock frequency $f_{clk}$ to the configuration parameters $P_c$. For instance, the function may be analogous to the look-up table of FIG. 4 by providing a mapping from the supply voltage V and the clock frequency $f_{clk}$ to a number of clock cycles required to accommodate an access latency of the memory.

In FIG. 5B, a calculation function is shown which receives a signal corresponding to a delay D exhibited by the delay line, and calculates configuration parameters $P_c$ as a function of the delay D in accordance with the general relationship:

$$P_c = F(D) \quad \text{(equation 2)}$$

As with FIG. 5A, the function F( ) may be one of many possible functions which provide a mapping from the delay D to the configuration parameters $P_c$. For instance, the amount of the delay D is likely to be proportional to the access latency of the memory, and so a simple relationship between the delay D and a number of clock cycles required to accommodate an access latency of the memory could be provided. It will be appreciated that while the functions illustrated in FIGS. 5A and 5B could be provided as alternatives, it is possible to provide a function which relates voltage V, clock frequency $f_{clk}$ and the delay D to one or more configuration parameters $P_c$.

Figure 6:
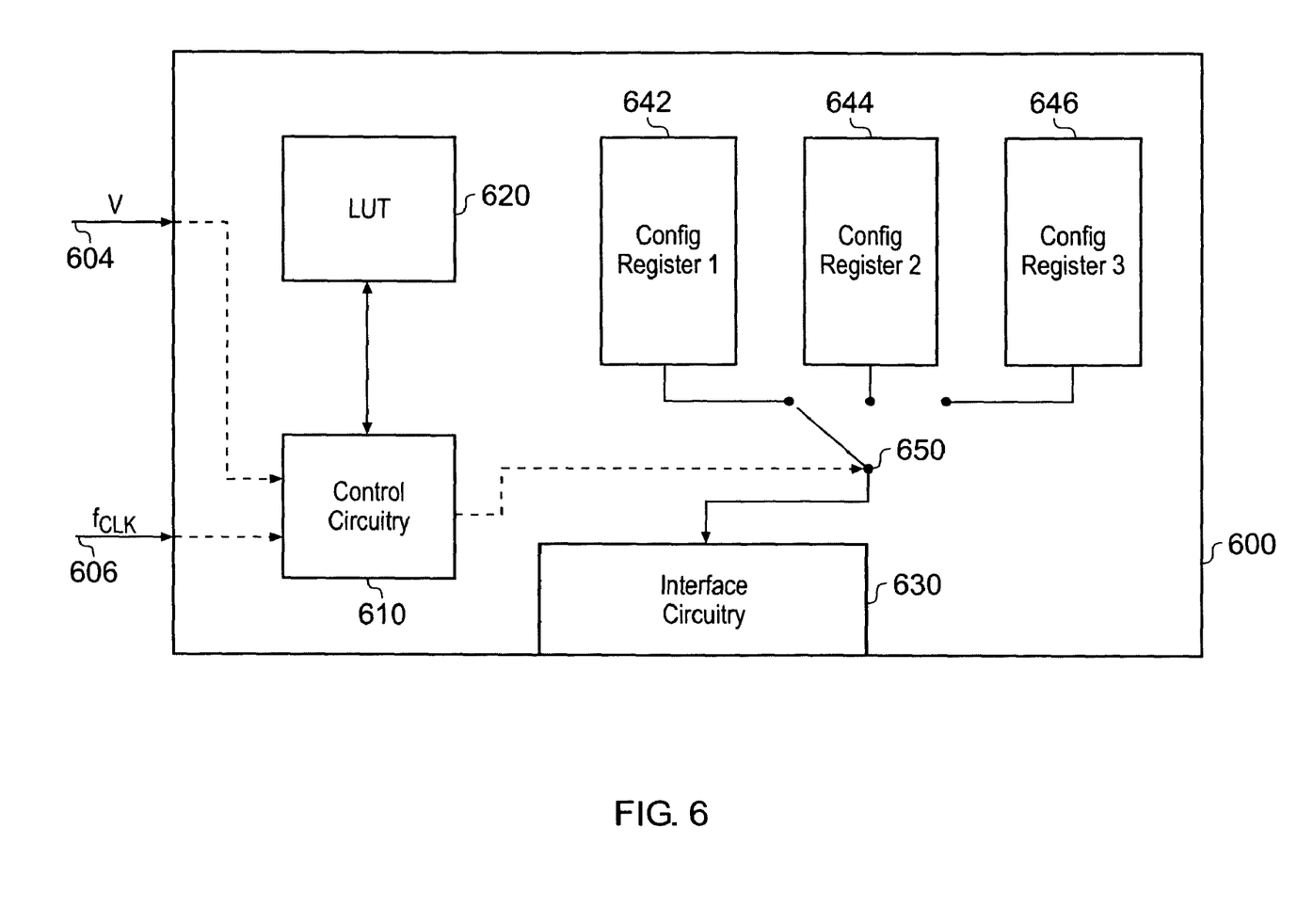
FIG. 6 schematically illustrates an example memory controller having three access control modes.

Referring now to FIG. 6, an example memory controller 600 is schematically illustrated. The memory controller 600 comprises interface circuitry 630 which provides a connection to a memory (not shown), and control circuitry 610 which is operable to set configuration parameters for controlling an access operation to read data from or write data to the memory. The control circuitry 610 sets the configuration parameters in dependence on a signal received at a first input 604 which is indicative of a supply voltage V, and on a signal received at a second input 606 which is indicative of a clock frequency $f_{clk}$. The control circuitry is operable to set the configuration parameters by selecting one of three configuration registers to be used to control an access operation via the interface circuitry 630. In particular, the configuration registers include a first configuration register 642, a second configuration register 644 and a third configuration register 646. In order to select an appropriate one of the configuration registers, the control circuitry 610 receives the signals indicative of V and $f_{clk}$ and then refers to a look-up table 620 which identifies, in respect of various combinations of supply voltage and clock frequency, the configuration register which should be used in order to accommodate the performance characteristics of the memory. When the control circuitry 610 has determined the appropriate configuration register from the look-up table, it operates a switch 650 to select the appropriate one of the configuration registers for use in controlling an access operation of the interface circuitry 630. As an example, the first configuration register could relate to a high power mode, the second configuration register could relate to a medium power mode and the third configuration register could relate to a low power mode.

Figure 7A:
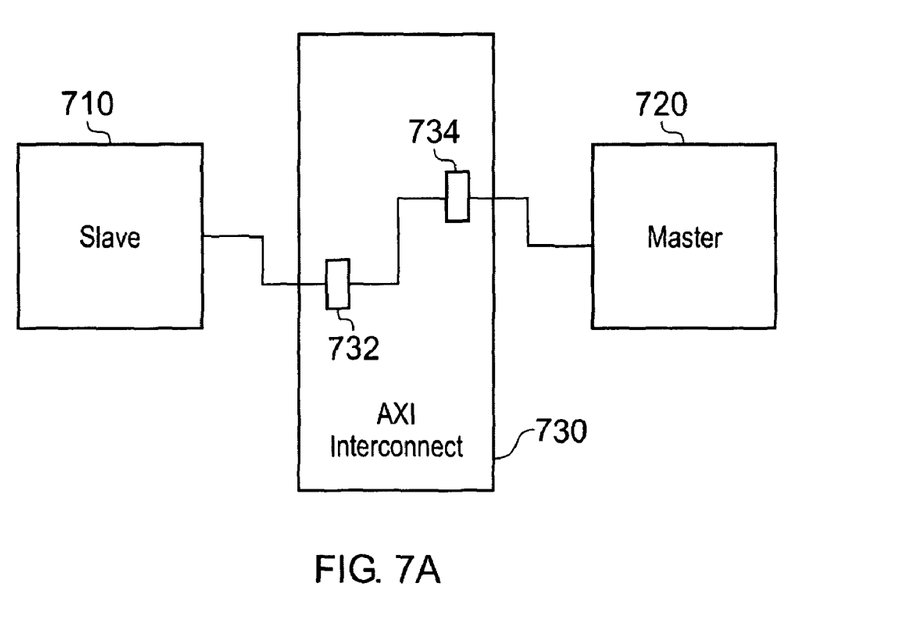
FIGS. 7A and 7B schematically illustrate an AXI interconnect in which registering is selected in accordance with operating parameters.
Figure 7B:
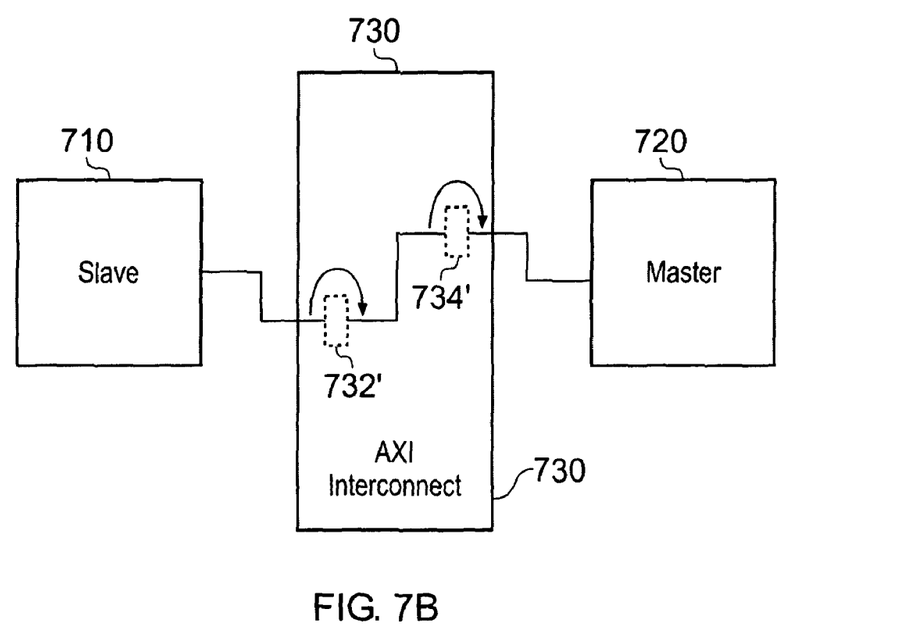

Referring to FIGS. 7A and 7B, an access by a bus master device 720 of a slave device 710 over an AXI interconnect 730 is schematically illustrated. The AXI interconnect 730 is a bus arrangement which may provide a set of registers for temporarily storing data which is being communicated across the interconnect 730 and which cannot cross the interconnect within a single clock cycle. In the present example of FIG. 7A, two registers are shown in the signal path between the slave device 710 and the master device 720, these being a first register 732 and a second register 734. In FIG. 7A, it takes 3 clock cycles for data to be transferred from the slave device 710 to the master device 720 across the interconnect 730. In particular, a first clock cycle is used to transfer data from the slave device 710 to the first register 732, a second clock cycle is used to transfer the data from the first register 732 to the second register 734, and a third clock cycle is used to transfer the data from the second register 734 to the master device 720. However, the speed with which data can be communicated across the interconnect 730 will depend on performance characteristics of the interconnect 730, which may in turn be influenced by the supply voltage and clock frequency operating on the interconnect. FIG. 7B illustrates the slave device 710, master device 720 and interconnect 730 of FIG. 7A in a state where the supply voltage has been increased and the clock frequency has been reduced. While in FIG. 7A, three cycles are required in order to transfer data from the slave device 710 to the master device 720, in FIG. 7B the data can be transferred from the slave device 710 to the master device 720 in a single cycle. Accordingly, as is shown in FIG. 7B, a first register 732' and a second register 734', corresponding to the first register 732 and the second register 734 of FIG. 7A, are shown to be bypassed in the access operation, because they are not required for a single clock cycle transfer. It will be appreciated that a different supply voltage and clock frequency combination could result in a situation where the transfer takes 2 cycles, in which case one or other (but not both) of the registers would be used.

Accordingly, it will be understood that the present technique could be used to select registering on an AXI interconnect depending on operating parameters such as voltage, clock frequency and also on the physical characteristics of the interconnect to take into account the performance characteristics of the interconnect. This may result in an improvement in efficiency when transferring data over the interconnect.

Figure 8A:
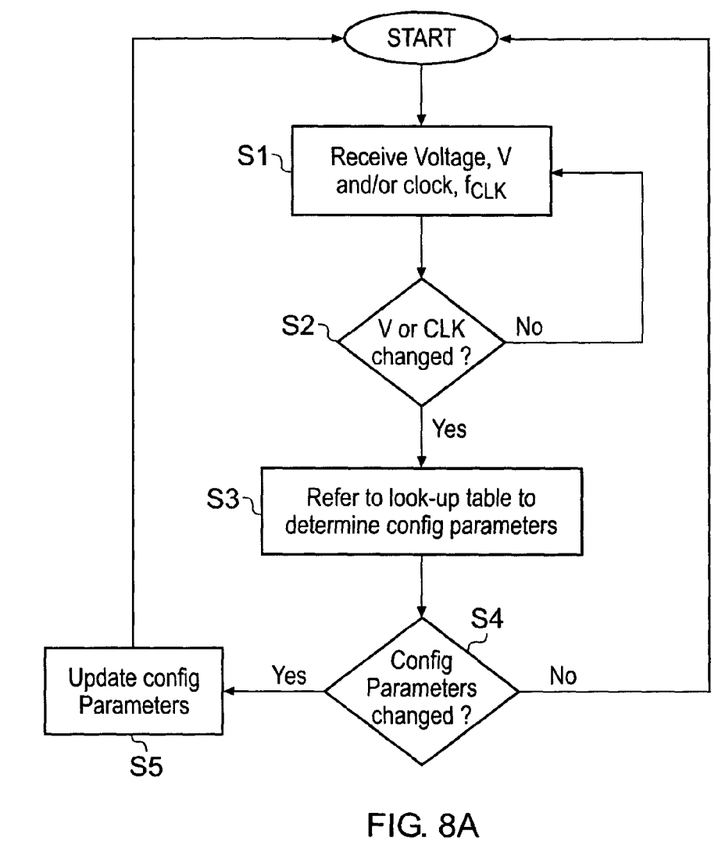
FIG. 8A is a schematic flow diagram illustrating a process of updating configuration parameters in response to changes in supply voltage and clock frequency.
Figure 8B:
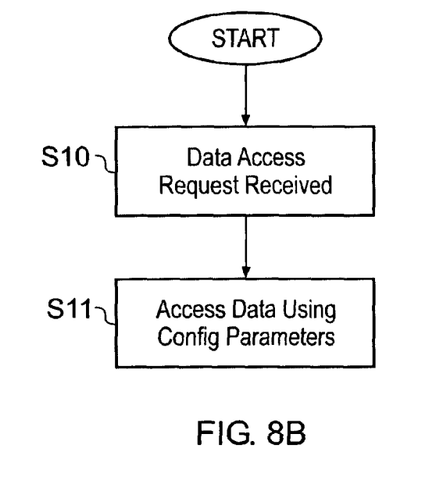
FIG. 8B is a schematic flow diagram illustrating a data access operation.

Referring to FIGS. 8A and 8B, schematic flow diagrams are provided which illustrate example methods of updating and using configuration parameters. In FIG. 8A, the configuration parameters are updated in the following steps. At a step S1, a signal representative of a supply voltage V, and/or a signal representative of a clock frequency $f_{clk}$ are received. At a step S2, it is determined whether or not the supply voltage V and/or the clock frequency $f_{clk}$ have changed, and if they have not changed the process returns to the step S1, whereby the supply voltage V and/or the clock frequency $f_{clk}$ are continuously monitored. If it is determined at the step S2 that one or both of the supply voltage V or the clock frequency $f_{clk}$ have changed, then the process moves on to a step S3, where a look-up table is referred to in order to determine which configuration parameters correspond to the new supply voltage and/or clock frequency. It is then determined at a step S4 whether the configuration parameters need to be changed as a result of the change in supply voltage and/or clock frequency.

If it is determined at the step S4 that the configuration parameters do not need to be changed, then the process returns to the start, whereby monitoring of the supply voltage V and clock frequency $f_{clk}$ can continue. If it is determined at the step S4 that the configuration parameters should change, then at a step S5 the configuration parameters are updated. The updating step S5 could be achieved either by setting new values for the configuration parameters directly, or by switching between configuration registers as described in relation to FIG. 6. Following the updating step S5, the process returns to the start, whereby monitoring of the supply voltage V and clock frequency $f_{clk}$ can continue.

In the memory access procedure described in FIG. 8B, which may occur in parallel with the configuration parameter updating procedure of FIG. 8A, a data access request is received by the memory controller over a bus at a step S10. In response to the data access request, the memory controller accesses the requested data of the memory using the configuration parameters at a step S11. The configuration parameters will be the most recently updated configuration parameters produced by the process described in FIG. 8A, thereby providing efficient and reliable access to the memory.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A self programming slave device controller, comprising:
    interface circuitry, responsive to one or more configuration parameters, is configured to control access operations for communicating data between said slave device controller and a slave device; and
    control circuitry, responsive to one or more operating parameter signals indicative of one or more current operating parameters of said slave device influencing current performance characteristics of accesses to said slave device, is configured to adapt said one or more configuration parameters so as to control an access operation for accessing said slave device to accommodate a change in said current performance characteristics, wherein said configuration parameters are stored in a plurality of banks of configuration parameters, said control circuitry being responsive to said operating parameter signals to select one of said banks of configuration parameters for controlling said access operation.

2. A self programming slave device controller according to claim 1, wherein said self programming slave device controller is a self programming memory controller, and said slave device is a memory.

3. A self programming slave controller according to claim 2, wherein said performance characteristics include one or more timing dependent parameters of said memory.

4. A self programming slave controller according to claim 3, wherein said timing dependent parameters include at least one of a read latency, write latency, turn around time and refresh period of said memory.

5. A self programming slave controller according to claim 2, wherein said performance characteristics include a memory access latency of said memory, and said configuration parameters include memory access parameters which are set so as to control an access time for accessing said memory to accommodate said current access latency of said memory.

6. A self programming slave controller according to claim 5, wherein said memory access latency is a read access latency and said memory access parameters include a read access parameter for controlling a read access to said memory to accommodate a current read access latency of said memory.

7. A self programming slave controller according to claim 5, wherein said memory access latency is a write access latency and said memory access parameters include a write access parameter for controlling a write access to said memory to accommodate a current write access latency of said memory.

8. A self programming slave controller according to claim 1, wherein said one or more operating parameters includes a supply voltage applied to said slave device.

9. A self programming slave controller according to claim 1, wherein said one or more operating parameters includes a frequency of a clock signal applied to said slave device controller and relative to which timing parameters of said slave device are measured.

10. A self programming slave controller according to claim 1, wherein said one or more operating parameter signals includes an output signal from a delay line associated with said slave device, said output signal being indicative of a speed of operation of said slave device.

11. A self programming slave controller according to claim 1, wherein said configuration parameters are set using a look up table which provides a correspondence between said configuration parameters and one or more of said operating parameters.

12. A self programming slave controller according to claim 1, wherein said configuration parameters are set in accordance with a calculation function which defines a relationship between said configuration parameters and one or more of said operating parameters.

13. A self programming slave controller according to claim 1, wherein said slave device controller forms part of an on-chip interconnect of a system-on-chip device.

14. A self programming slave controller according to claim 13, wherein said slave device is provided on-chip.

15. A self programming slave controller according to claim 13, wherein said slave device is provided off-chip.

16. A self programming memory controller comprising:
   interface circuitry configured to control access operations for communicating data between said memory controller and an associated memory in response to one or more configuration parameters; and
   control circuitry, responsive to one or more current operating parameters of said associated memory influencing current performance characteristics of said associated memory, to adapt one or more of said configuration parameters for controlling the communication of data between said memory controller and said memory to accommodate a change in said current performance characteristics, wherein said configuration parameters are stored in a plurality of banks of configuration parameters, said control circuitry being responsive to said operating parameter signals to select one of said banks of configuration parameters for controlling said access operation.

17. A self programming slave device controller, comprising:
   interface means for communicating data between said slave device controller and a slave device in accordance with one or more configuration parameters; and
   control means for adapting said one or more configuration parameters in response to one or more operating parameter signals indicative of one or more operating parameters of said slave device influencing current performance characteristics of accesses to said slave device, said configuration parameters adapted to control an access operation for accessing said slave device to accommodate a change in said current performance characteristics, wherein said configuration parameters are stored in a plurality of banks of configuration parameters, said control means being responsive to said operating parameter signals to select one of said banks of configuration parameters for controlling said access operation.

18. A method of self programming a slave device controller, comprising the steps of:
   communicating, responsive to one or more configuration parameters, data between a slave device controller and an associated slave device in accordance with said one or more configuration parameters; and
   adapting said one or more configuration parameters, responsive to one or more operating parameter signals indicative of one or more operating parameters influencing current performance characteristics of accesses to said slave device, to control an access operation for accessing said slave device to accommodate a change in said current performance characteristics, wherein said configuration parameters are stored in a plurality of banks of configuration parameters, one of said banks of configuration parameters being selected for controlling said access operation, responsive to said operating parameter signals.

19. A method of self programming a slave device controller according to claim 18, wherein said slave device controller is a self programming memory controller, and said slave device is a memory.

20. A method of self programming a slave controller according to claim 19, wherein said performance characteristics include one or more timing dependent parameters of said memory.

21. A method of self programming a slave controller according to claim 20, wherein said timing dependent parameters include at least one of a read latency, write latency, turn around time and refresh period of said memory.

22. A method of self programming a slave device controller according to claim 19, wherein said performance characteristics include a memory access latency of said memory, and said configuration parameters include memory access parameters which are set so as to control an access time for accessing said memory to accommodate said current access latency of said memory.

23. A method of self programming a slave device controller according to claim 22, wherein said memory access latency is a read access latency and said memory access parameters include a read access parameter for controlling a read access to said memory to accommodate a current read access latency of said memory.

24. A method of self programming a slave device controller according to claim 22, wherein said memory access latency is a write access latency and said memory access parameters include a write access parameter for controlling a write access to said memory to accommodate a current write access latency of said memory.

25. A method of self programming a slave device controller according to claim 18, wherein said one or more operating parameters includes a supply voltage applied to said slave device.

26. A method of self programming a slave device controller according to claim 18, wherein said one or more operating parameters includes a frequency of a clock signal applied to said slave device controller and relative to which timing parameters of said slave device are measured.

27. A method of self programming a slave device controller according to claim 18, wherein said one or more operating parameter signals includes an output signal from a delay line associated with said slave device, said output signal being indicative of a speed of operation of said slave device.

28. A method of self programming a slave device controller according to claim 18, wherein said configuration parameters are set using a look up table which provides a correspondence between said configuration parameters and one or more of said operating parameters.

29. A method of self programming a slave device controller according to claim 18, wherein said configuration parameters are set in accordance with a calculation function which defines a relationship between said configuration parameters and one or more of said operating parameters.

30. A method of self programming a slave device controller according to claim 18, wherein said slave device controller forms part of an on-chip interconnect of a system-on-chip device.

31. A method of self programming a slave device controller according to claim 30, wherein said memory is provided off-chip.

32. A method of self programming a slave device controller according to claim 18, wherein said slave device is provided on-chip.

33. A method of self programming a memory controller comprising the steps of:
   communicating, responsive to one or more configuration parameters, data between a memory controller and an associated memory in accordance with said one or more configuration parameters; and
   adapting one or more configuration parameters, responsive to one or more operating parameters of said associated memory influencing current performance characteristics of said associated memory to accommodate a change in said current performance characteristics, wherein said configuration parameters are stored in a plurality of banks of configuration parameters, one of said banks of configuration parameters being selected for controlling said access operation, responsive to said operating parameter signals.

* * * * *